United States Patent [19]

Miyada

[11] Patent Number: 4,657,105
[45] Date of Patent: Apr. 14, 1987

[54] OPENABLE WINDSHIELD SYSTEM

[76] Inventor: Thomas S. Miyada, P.O. Box 430, Summit, N.J. 07901-0430

[21] Appl. No.: 820,560

[22] Filed: Jan. 21, 1986

[51] Int. Cl.$^4$ .................. B60K 28/14; B60R 21/08
[52] U.S. Cl. ................................ 180/274; 280/749
[58] Field of Search ............... 180/274; 280/748, 749; 296/84 R, 84 D, 84 G, 84 K

[56] References Cited

U.S. PATENT DOCUMENTS

| | | | |
|---|---|---|---|
| 1,186,865 | 6/1916 | Uttz | 296/84 K |
| 1,256,848 | 2/1918 | Uttz | 280/749 |
| 1,763,695 | 6/1930 | Field | 296/84 G |
| 2,194,390 | 3/1940 | Hubbard | 180/274 |
| 2,592,573 | 4/1952 | Joncas | 296/84 R |

FOREIGN PATENT DOCUMENTS 1931513  12/1970  Fed. Rep. of Germany ... 296/84 K

Primary Examiner—John J. Love
Assistant Examiner—Karin L. Ferriter

[57] ABSTRACT

This invention is intended to prevent the front seat riders of automotive vehicles from being thrown against the windshield when their speeding vehicle suddenly stops in an accident. It includes a collision contact bar, two longitudinal bars, a plurality of electric motors, shafts, chains, gear wheels, and a safety net. The collision contact bar which is securely positioned on the front of the vehicle's front bumper, if struck, causes the longitudinal bars to be pushed rearward, the movement of which closes the circuit to the electric motors, which turns the gear wheels and the shafts, and opens forwardly the windshield, which in turn pulls down a safety net between the front seat riders and its erstwhile position.

4 Claims, 13 Drawing Figures

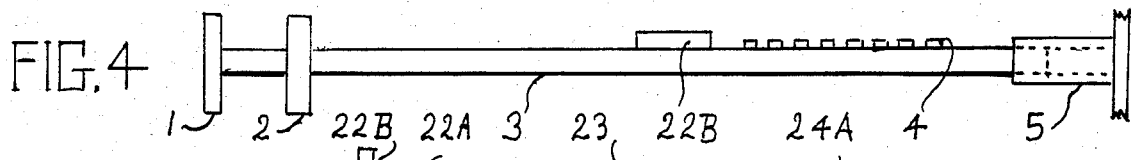
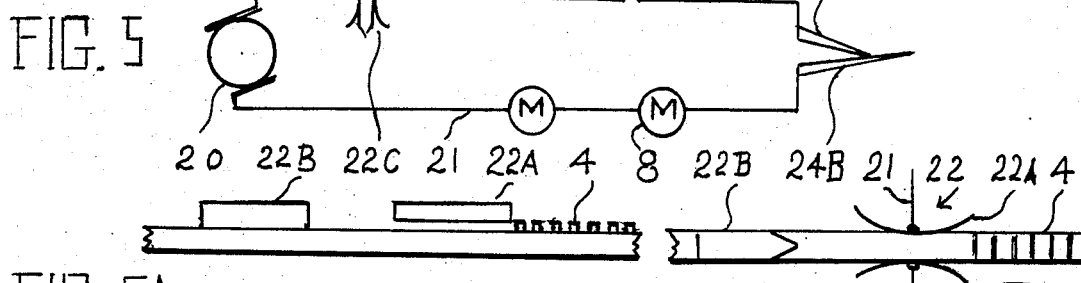
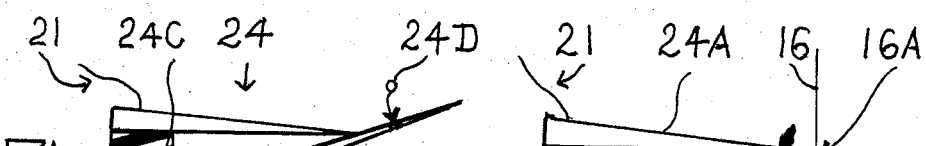
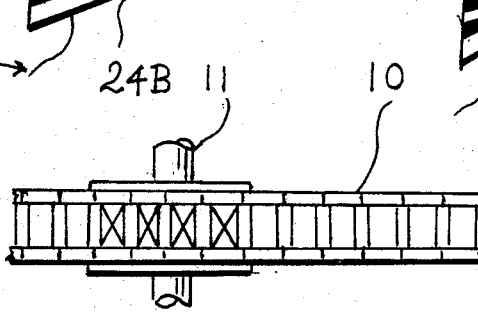
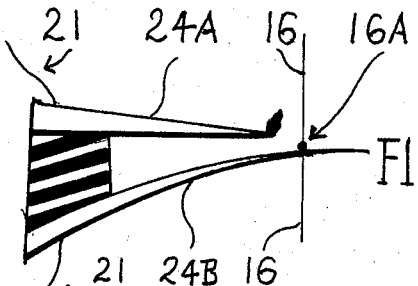
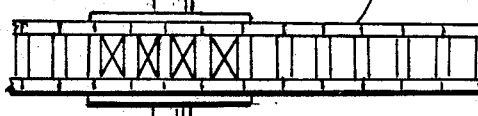
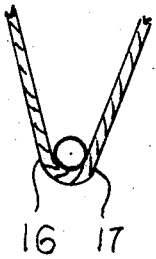
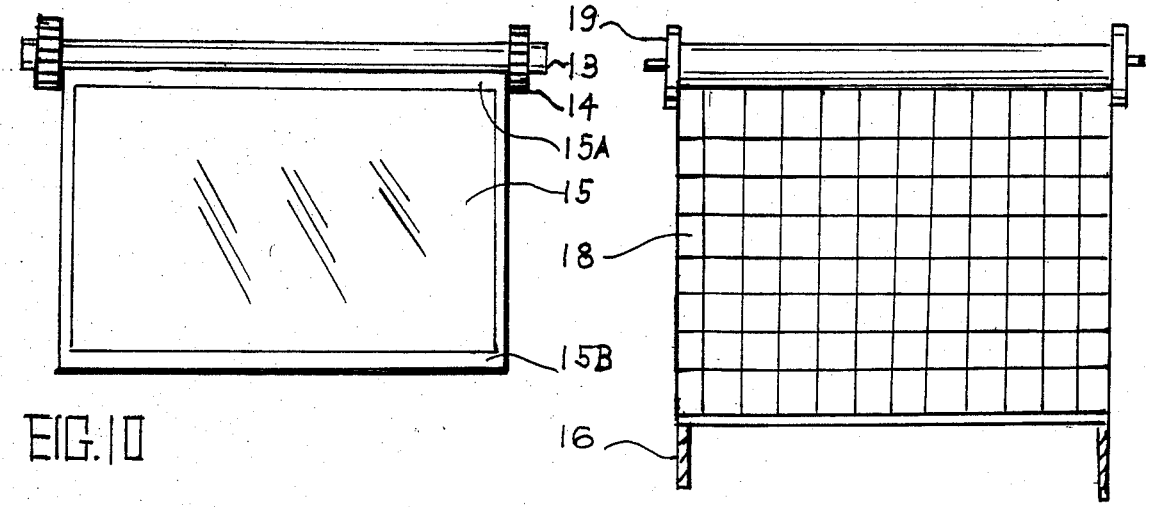

OPENABLE WINDSHIELD SYSTEM

FIELD OF INVENTION

The present invention relates to an openable windshield system for the prevention of front seat riders from being thrown against the front windshield when their speeding vehicles suddenly stop. In its broad sense, it can be described as an invention belonging in the field of automotive vehicles' safety system or just safety device.

DESCRIPTION OF PRIOR ART

Automotive safety devices currently in use include safety belts and air bags. Unfortunately safety belts are not always worn by the passengers and air bags open with an explosive noise and may open prematurely or too late.

The following inventions deal with the safety of front seat riders of vehicles in various ways: U.S. Pat. Nos. 3721468 Burgess; 2,782,756 Brown; 2,854,281 Cassin; 3,695,629 Schlanger; 3,692,327 Barrick; 3,692,327 Schlanger; 4,171,140 Toshihisa; 3,831,975 Mednikow; 3,650,542 Shimano et al, 4,500,125 Kincheloe; 2,025,822 (Pryor). Among the above listings, Pryor, Barrick, and Schlanger use nets, but in a manner quite different from this invention. They do not have a mechanically openable windshield.

SUMMARY

This invention relates to an openable front windshield for the prevention of front seat riders from being thrown against the windshield when their fast moving vehicle suddenly stops.

There are three types of openable front windshields. The first type opens by virtue of inertia. For example, when a speeding car suddenly stops, the front windshield will fly open if hinged on its top side and free on its other sides. A patent was applied for this type of openable windshield on Sept. 7, 1984 by this applicant, Patent office Ser. No. 648,482. The second type of openable front windshield is based on manual dexterity of the operator.

The instant invention falls into a third type of openable front windshield in which neither inertia nor human interaction is required. In this catagory, mechanical and electrical means are used to open the windshield in response to collision.

In the embodiment disclosed herein a collision contact bar is mounted in front of the vehicle's bumper so that in the event of a collision the collision contact bar will be moved backwards causing rack gear bars to move likewise, and in turn begin rotation of a gear mechanism associated with the windshield. As the gear mechanism opens the windshield a safety net is pulled into the resulting space thereby preventing a passenger from being thrown through the windshield frame.

DRAWINGS

FIG. 4 is a side view of the horizontal longitudinal bar.

FIG. 5 is that of the electric circuit of the system.

FIG. 6A shows the side view of the conducting strip.

FIG. 6B shows the plan view of the conducting strip and automatic switch blades. (The strip and the blades working together performs the function of a switch.)

FIG. 7A is that of the automatic control device with the circuit closed.

FIG. 7B is that of the automatic control device with the circuit opened.

FIG. 8 is a section of the chain gear.

FIG. 9 shows the roller with the pulling cord under it.

FIG. 10 is that of the openable windshield with its top frame attached to the third shaft.

FIG. 11 shows the silk net.

NUMERALS IN THE DRAWINGS

Figure 1:
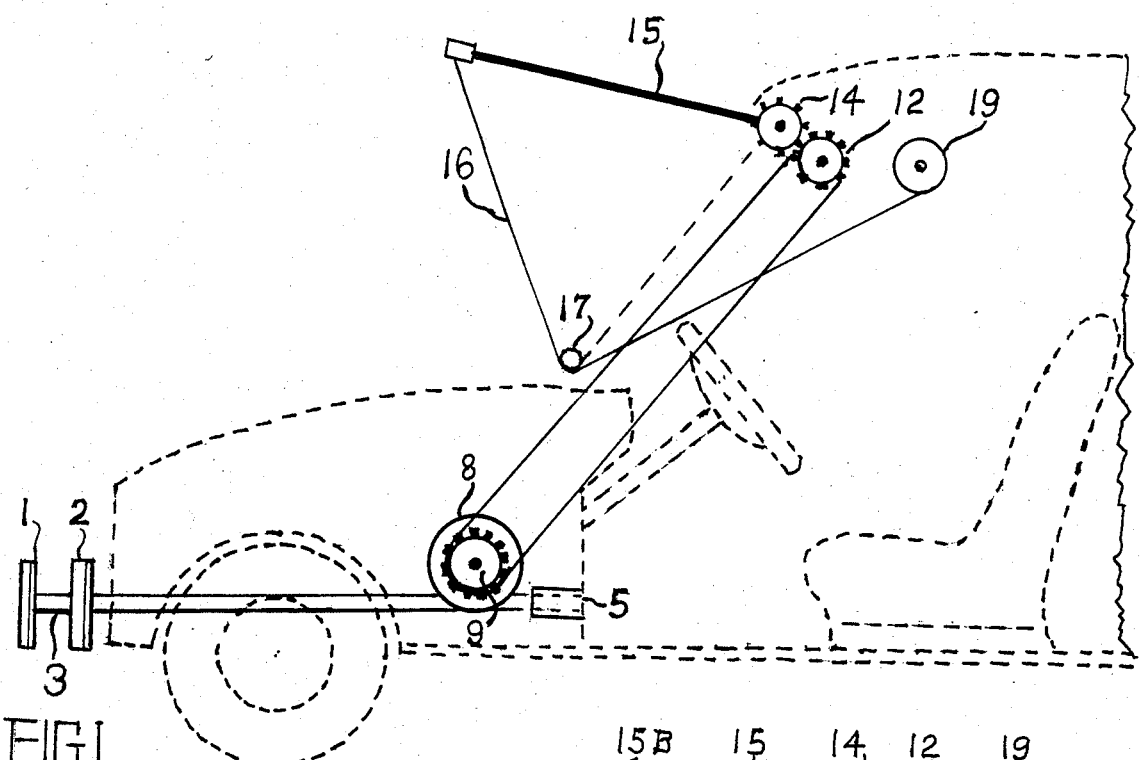
FIG. 1 is a schematic drawing showing the side view of the system in the context of the forward section of the vehicle.
Figure 2:
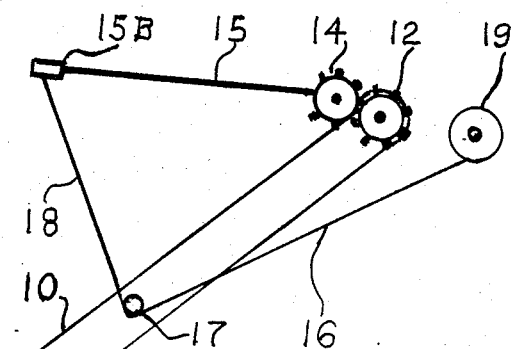
FIG. 2 is a side view of the system without the context (vehicle).
Figure 3:
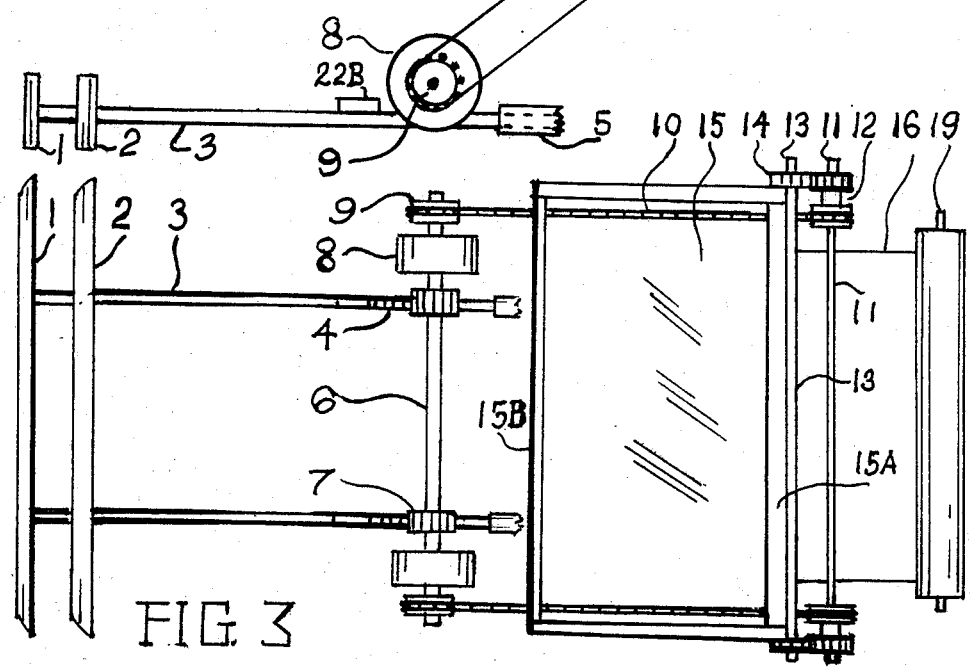
FIG. 3 is a plan view in schematic of the system shown in FIG. 2.

0=void, empty space, nothing.
1=collision contact bar.
2=front bumper.
3=horizontal longitudinal bar.
4=gears on horizontal longitudinal bar.
5=cylindrical support for horizontal longitudinal bar.
6=first shaft.
7=gear wheel on first shaft.
8=electric motor.
9=gear wheel next to the motor.
10=gear chain.
11=second shaft.
12=twin gear.
13=third shaft.
14=gear wheel on third shaft.
15=front windshield.
15A=upper frame of the windshield.
15B=bottom frame of the windshield.
16=pulling cord of the silk net.
16A=pulling cord with the knot.
17=roller for the pulling cord.
18=silk net.
19=spool.
20=generator.
21=electric line.
22=automatic switch.
22A=curved blades of automatic switch.
22B=conducting strip located on the upper side of the horizontal longitudinal bar, but in function a part of the automatic switch since it closes the circuit when it passes through the curved blades 22A.
22C=air space between 22A.
23=rheostat.
24=automatic control device.
24A=a short top blade of 24.
24B=long bottom blade of 24.
24C=insulator between 24A and 24B.
24D=a hole in the free end of 24B.

DETAILED DESCRIPTION OF THE COMPONENTS

The best and the easiest way to describe this invention so that any person skilled in the art could understand it is to assume that all its parts are properly assembled and in a working condition as a system in the vehicle, and to agree that the left and the right side of the vehicle, the individual parts of the invention, their motion, or the system corresponds to the left or the right side of the operator of the vehicle as he or she faces forward, and that the front or back (rear) side of the parts of invention, the direction of their movement or system correspond to the frontward or rearward side of the vehicle.

This invention or system comprises of the following parts, which perform the various functions described therein:

(1) Collision contact bar: It has a metallic bar or its equivalent in strength called collision contact bar (1) or just contact bar, constructed approximately as long and wide as the conventional front bumper of vehicles and positioned infront of, and parallel to, the front bumper (2) with an air space of six, seven or more inches between it and the bumper, depending, of course, on the size of the vehicle.

(2) Two horizontal longitudinal bars: The said collision contact bar (1) is supported and held by two horizontal longitudinal bars (3), one located on the left side and the other on the right side, and extending into the forepart of the vehicle's body and parallel to the longitudinal line of the vehicle. The front end of the each of the longitudinal bars goes through a hole made in its side of the front bumper (3) and then it is screwed into the contact bar (1); its mid section passes near or the side of the vehicle's engine; and its rear end reaching the furthermost rear section of that part of the vehicle under the hood corresponding to a section approximately below the lower part of the windshield. The rear end of each longitudinal bar is slidingly held in a cylindrical holder (5), which is attached to its side of the vehicle body. That part of the rear end section of each of the longitudinal bars, not held inside the cylindrical holder, is provided with a set of gear teeth (4) arranged horizontally on its upper side.

(3) First shaft and its electric motors and gear wheels: A little above the geared end section of the horizontal longitudinal bars and positioned at right angle to them is the first shaft (6) that extends almost the full width of the vehicle's hood section. Two wheel gears (7), one above the left geared end section of the left horizontal longitudinal bar and the other above the right geared end section of the right horizontal longitudinal bar, are provided and held through their center by, and keyed to, the first shaft (6).

(4) The said first shaft is also provided with electric motors (8). The right section of the first shaft (6) serves as the shaft for the right motor, and the left section of the said shaft serves as the shaft of the left motor. The motors themselves have their bases securely held by supports attached to the vehicle's framework. The shaft protruding from the right side of the right motor has a gear wheel (9) keyed to it, and the shaft protruding from the left side of the left motor also has a gear wheel keyed to it as a common shaft. The said shaft's extreme ends are rotatively held in cylindrical holders attached to the vehicle's body.

(5) Electric circuit: The line (21 in FIG. 5) leaves the generator or the batteries (20) and proceeds to a switch (22) and rheostat (23), and then to an automatic control (24), and thence to the motor and returns to the generator or the batteries (20). The switch (22), which is automatic and normally open, consists of two curved steel blades, each (22a) attached to the severed end of the line and securely positioned like the two curves of a hyperbola with a narrow air space between them. It is located just above one of the longitudinal horizontal bars (3), which has on one of its rear top sides a conducting (22b) strip that slides into the said narrow air space (22c) to close the circuit when a front end collision causes the horizontal longitudinal bar to be pushed backward. The automatic control (24), which resembles a switch in function, consists of two flat layers of flexible steel blades, a short top one (24a) and a long bottom one (24b) having their one end held together and with an insulator (24c) between them, and their other end free but in direct contact. The long bottom blade has a hole (24d) made in its free end, the size of which is large enough for a pulling cord (16), to be described, to pass through, but not large enough for a cord with a knot to go through.

(6) Second shaft and its gear wheels. Below and close to the front section of the front roof of the vehicle and held securely under the roof and extending almost the full length of the windshield and parallel to it is a second shaft (11) with twin gear wheels (12), keyed to each of its end sections. The twin gear wheel (12) consists of two identical gear wheels joined together as a single unit.

The left twin gear of the second shaft has one part of the unit in mesh with the left chain gear (10), to be described below, and the other part in mesh with the left gear wheel of the third shaft (13). The right twin gear wheel has one part of it in gear with the right chain gear and the other part in mesh with the right gear of the third shaft.

(7) Gear chain: Two endless gear chains (10) are provided. One is operatively attached to the left gear wheel of the first shaft (6) and to the left twin gear wheel of the second shaft (11), and the other attached likewise to the right gear gear wheel of the first shaft and to the twin gear wheel of the second shaft.

(8) Third shaft and its gear wheels: The third shaft (13) is located above and slightly toward the front of the second shaft (11) and is about the same length as the second shaft. Its left end is rotatably held in a specially prepared opening in the sideward bent part of the front left section of the vehicle's front roof, and its right end is also rotatably held in a similar opening in the corresponding location on the right side of the front roof. It has keyed to each of its end sections a gear wheel that is always in mesh with those of the second shaft.

(9) Third shaft and the windshield: The full length of the upper frame (15a) of the windshield (15), preferably made of strong metal, is securely attached to the third shaft (13), and the inner radial side of the gears of the third shaft are also securely attached to the upper section of the side frames of the windshield, and the latter can swing open upward. That part of the windshield or its sides, not held by the third shaft and its gear wheels are cushioned with rubber.

(10) Safety net or canvas: Almost hidden behind the second and the third shafts and rotatable held by extensions from the vehicle's roof is a spool (19) containing a roll of safety net or of (18 and, which in its unrolled condition is rectangular in shape and having an area about equal to that of the windshield. The net (18) or the (18a) has a pulling cord

(16) attached to its left forward side and a like cord attached to the corresponding location on the right side. One of the pulling cords is knotted (16a) close to the safety net or canvass, and its unknotted section passes through a hole (24d) made in the long blade (24b) of the automatic control (24), goes under a roller in an opening (0) made below the windshield (15), and securely attaches itself to the bottom frame (15b) of the windshield, while the unknotted pulling cord goes under an opposite roller in a hold (0) on its side and attaches itself to its side of the bottom frame of the windshield.

VARIATIONS

The foregoing descriptions are those of the preferred embodiment. Various minor changes can be made in the invention without departing from the mechanical principle and scope of this invention.

In one of the embodiments of this invention, the endless chain gears that connect the gear wheels of the first shaft to those of the second shaft are replaced by a generally vertical shaft, slightly leaning rearward, having matched gears of the worm type (20) on both ends. The gear wheels on both ends of the first and the second shafts are also changed to matching worm gears.

OPERATION

How the above parts are put together has been already explained when the parts were described. To understand how the above parts function as a system, it may be advisable to start with a hypothetical front end collision.

First, a moving object strikes the collision contact bar (1), which and its horizontal longitudinal bars (3) are pushed backward.

Second, almost instantly the gear end section (4) of the horizontal longitudinal bars (3) start the electric motors (8) and the gear wheels (9) on the first shaft and the gear chains (10) to turn.

Third, the endless gear chain (10) turns the gear wheels of the second shaft (11), which are in mesh with those of the third shaft (13). Since the top frame of the windshield is attached to the third shaft, when that shaft turns, the windshield will fly open.

Fourth, as the windshield opens mechanically, its bottom frame, holding the pulling cords (16), pulls down between the front seat and the erstwhile position of the windshield a safety net (18) or canvas (18a) to protect the front seat riders.

With the opening of the windshield and the pulling of the cords attached to the net or canvas, a knot (16a) in one of the cords will be stuck in the hole (24d) made in the bottom long blade (24b) of the automatic control (24), and the further pulling downward of that cord will pull the long blade (24d) downward and opens the electric circuit and stops the electric motors.

Having described my invention in the foregoing specification and having illustrated them in the accompanying drawing, I hereby claim the following for the purpose of securing Letters Patent:

1. An openable windshield system in combination with a vehicle for preventing occupants of a front seat of said vehicle in the event of sudden deceleration from being thrown against a windshield of the vehicle, said system comprising:

a collision contact bar positioned horizontally and parallel to a front bumper of the vehicle with an air space between said bumper said contact bar;

two horizontal longitudinal bars having forward ends extending through a hole in the vehicle bumper and attached to said contact bar and a rearwardly extending end extending into an engine compartment of the vehicle, each of said horizontal bars having said rear end slidably held in a holder attached to a body section of the vehicle and a horizontal row of gear teeth;

a first shaft positioned perpendicular to said horizontal longitudinal bars, and having gear wheels in mesh with the gear teeth on each of said horizontal longitudinal bars;

two electric motors connected to opposite ends of said first shaft, each having a first gear wheel keyed to said first shaft; said electric motors connected to an electrical circuit having a switch which in response to rearward motion of said longitudinal bars activate said electric motors;

a second shaft rotatably mounted to a front roof section of the vehicle and having a pair of gear wheels mounted thereon;

two chains, each chain operably attached to one of said first gear and said twin gears;

a third shaft rotatably mounted to said front roof section adjacent said second shaft, such third shaft having gears mounted thereon in mesh with said twin gears;

said windshield being openable and having an upper frame member securely attached to said third shaft so as to rotate therewith and a lower frame member connected with a cord to a safety net where rearward movement of said horizontal longitudinal bars activates said electrical motors thereby causing the gear wheels to turn, the windshield to open, and the safety net to be pulled in front of the vehicle occupant.

2. An openable windshield system according to claim 1, wherein said electric circuit connects said electric motors with a generator of the vehicle and includes:

a normally open automatic switch, comprised of two curved blades located on opposite longitudinal sides said horizontal bars having a front end passing through a hole in a said bumper and secured to said contact bars and a rear end slidably held in a holder fixed to a rear section of the vehicle, and a row of gear teeth;

a first shaft positioned and rotatably held perpendicular to said horizontal longitudinal bars, said shaft having two gear wheels mounted thereon each in mesh with said geared teeth of said horizontal longitudinal bars;

two electric motors connected to opposite ends of said first shaft, each having a first gear wheel keyed to said first shaft, said electric motors rotating said shaft and said first gears;

an electric circuit including, in sequence:

a generator; an automatic switch, which is normally open, a rheostat, an automatic control, which is normally closed and said motor;

a second shaft positioned parallel to the windshield and rotatably held under a front section of a front roof of the vehicle, said second shaft having two twin gear wheels each consisting of two identical gear wheels joined together as a unit;

a pair of chains each operably attached to one of said gear wheels of the first shaft and one of said twin gears of the second shaft;

a third shaft rotatably secured to said vehicle's front roof and having two gear wheels mounted of the longitudinal bar, said switch closing when a conducting strip mounted on the rearward end of said horizontal longitudinal bar moves with said bar between said blades;

a rheostat;

an automatic control device comprised of two flexible blades, a first of said blades located above a second of said blades, said blades being held together on one end with an insulator between them, and having the opposite ends free and normally in contact.

3. An openable windshield system as described in claim 2, wherein said automatic control device includes a hole in said free end of said second blade where said second blade is pulled downwardly by a knot in said cord as the windshield opens thereby opening said circuit and stopping the motors.

4. An openable windshield system in combination with a vehicle for preventing occupants of a front seat of the vehicle from being thrown against a windshield of said vehicle in the event of sudden decelleration of the vehicle, said system comprising:

a collision contact bar positioned parallel to and spaced from a front bumper of the vehicle;

two horizontal longitudinal bars extending into an engine compartment of the vehicle and positioned on opposite sides of an engine of the vehicle, each of thereon, each in mesh with a part of one of said twin gears;

said windshield having an upper frame member securely attached to said third shaft and having sides cushioned with rubber strips;

a safety net, rolled in a spool and rotatably held under the front roof behind the second and the third shafts;

and a pair of pulling cords, a first cord attached to a forward left side of the net and having a knot close to the net, where first cord passes through a hole made in a blade of the automatic control device, then under a roller before being attached to a side of a bottom frame of the windshield, and a second cord attached an opposite section of the net where said second cord passes under a roller and is attached to the bottom frame of the windshield.

* * * * *